United States Patent Office 3,296,239
Patented Jan. 3, 1967

3,296,239
BLENDING OF POLYPROPYLENE WITH NICKEL ORGANIC COMPOUNDS TO IMPROVE DYEABILITY
Gabriel Karoly, Elizabeth, Robert I. McDougall, Newark, and Albin F. Turbak, New Providence, N.J., assignors to Esso Research and Engineering Company, a corporation of Delaware
No Drawing. Filed Feb. 1, 1963, Ser. No. 255,668
3 Claims. (Cl. 260—93.7)

This invention relates to a process for treating alpha olefin polymers to render them dyable.

Poly alpha olefin polymers have found increasing interest as textile materials because of their desirable properties of strength and low cost. One of the more difficult problems encountered, however, has been the poor dye acceptance of such fibers because of the inertness of a hydrocarbon polymer. Although a poly alpha olefin material, such as polypropylene, can be dyed, its fastness to typical textile environments has been inadequate.

It has now been found that the receptivity of alpha olefin polymers to dyeing may be improved by blending the polymer with 0.05 to 5 weight percent, preferably 0.1 to 1.0 weight percent of a nickel-organic compound; spinning the blend into fibers; and then contacting these fibers with a water-insoluble ortho hydroxy azo dye. When the polymer is treated in this manner, not only is the dye uptake improved, but more importantly, the resistance of the dyed product to light and washing is improved.

While this invention is principally directed to the dyeing of fibers or filaments, it may also be used to dye poly alpha olefin films, foils, and other formed products.

The polymers treated by the process of the invention are alpha olefin homopolymers and copolymers. The alpha olefin homopolymer can be prepared by any known process, such as the so-called Ziegler process, see for example Belgian Patent 533,362 and Belgian Patent 538,782. Examples of homopolymers within the scope of the invention include polyethylene, polypropylene, poly 1-butene, poly 1-heptene, and polyisobutylene. Polymers or copolymers of branched chain alpha olefins where the branching occurs no closer than the third carbon atom can also be employed such as poly 4-methyl-1-pentene and poly 3-methyl-1-butene. In general, the homopolymers are prepared from alpha olefins having from 2 to 12 carbon atoms. The copolymers employed in the process of the invention include copolymers of two different alpha olefins such as ethylene-propylene copolymers, ethylene-1-hexene copolymers, and alpha olefin-aromatic olefin copolymers containing from 1 to 15% by weight of an aromatic olefin, such as for example copolymers of styrene and 4-methyl-1-pentene. Also, blends of one or more of the previously mentioned polymers can be employed. The polymers and copolymers employed in the invention have molecular weights ranging from 100,000 to 1,000,000. The preferred polymers and copolymers of the invention are those prepared by the use of alkyl metal catalysts. Most preferred is polypropylene. Catalysts which are useful in this process are mixtures of reducible heavy transition metal compounds and reducing metal containing substances, or mixtures of partially reduced heavy transition metal compounds and organo-metallic activators. Examples of these catalysts are $TiCl_4 + AlEt_3$ and $TiCl_3 + AlEt_3$. The catalysts used for preparing the preferred polymers employed in the instant process are those catalysts given on page 6, line 20 to page 10, line 21 of application Serial No. 831,210, filed August 3, 1959.

The nickel organic compounds which are useful in this invention are of several classifications which follow:

(1) Nickel derivatives of beta diketones having the general formula R—CO—$CH_2$—CO—R wherein R is a $C_1$ to $C_{10}$ hydrocarbon preferably $C_1$ to $C_6$. Examples of these are nickel acetylacetonate, nickel propylacetonate, and nickel benzoylacetophenonate, etc. Most preferred is nickel acetylacetonate.

(2) Nickel derivatives of beta keto esters having the formula R—CO—$CH_2$—COOR′ where R is a $C_1$–$C_{10}$ hydrocarbon, preferably $C_2$–$C_8$ and R′ is a $C_1$–$C_{20}$ organic radical, preferably $C_1$–$C_{10}$. Examples of these are nickel $C_8$ oxoacetoacetate, nickel $C_4$ acetoacetate and nickel $C_8$ oxopropioacetate. Most preferred is nickel $C_8$ oxoacetoacetate.

(3) Nickel derivatives of aryl ketones of the following structure:

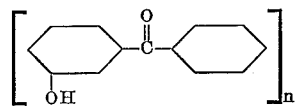

wherein the ring carbon meta to the hydroxyl group may be substituted with a $C_1$–$C_{10}$ alkyl or alkoxy group, and the remaining ring carbons may be substituted fully or partially with halogen groups, and n equals 1 or 2. Examples of these compounds include nickel bis 2-hydroxy 4-methoxybenzophenone, nickel bis 2-hydroxy 4-chloro, 4′-methoxybenzophenone and nickel bis 2-hydroxy 4-octoxy benzophenone. Most preferred is the nickel salt of 2-hydroxy-4-methoxybenzophenone.

Other types of aryl ketones may be operative in this invention. Thus, although they have not been tested, it is possible that aryl ketones of the type described above would be useful if the unsubstituted benzene ring were replaced with an alkyl or a cycloalkyl group.

Dyes which have application in this invention are ortho hydroxy azo dyes, which are water insoluble. These dyes include mono-azo dyes, conjugated di and multi-azo dyes as well as azo-pyrazolone o,o′-dihydroxy azo and o-hydroxy-o′-carboxy azo type dyes. The dyes may be preformed or prepared by in situ diazotization and coupling on the fiber. Examples of these dyes and their structures are as follows:

| Dye Name | Structure |
|---|---|
| Oil Red O (Solvent Red #27) | (structure shown) |
| Oil Red EGN (Solvent Red #26) | (structure shown) |

| Dye Name | Structure |
| --- | --- |
| Sudan Red 4BA (Oil Red #24) | (azo dye structure: methylphenyl–N=N–methylphenyl–N=N–hydroxynaphthyl) |
| Sudan Red GGA (Solvent Red #22) | (hydroxynaphthyl–N=N–(CH₃,CH₃)phenyl–CH(Cl)(phenyl)–(CH₃,CH₃)phenyl–N=N–hydroxynaphthyl) |
| Sudan Orange RA New (Solvent Yellow #14) | (phenyl–N=N–hydroxynaphthyl) |
| Sudan Orange RRA (Solvent Orange #7) | (CH₃–(CH₃)phenyl–N=N–hydroxynaphthyl) |
| Oil Orange O PEL (Solvent Orange #2) | (methylphenyl–N=N–hydroxynaphthyl) |
| Orasol Yellow 3G (Solvent Yellow 17) | (phenyl–N=N–C(HO)=C(CH₃)–N=N–chlorophenyl pyrazolone) |
| Sudan Yellow GR (Solvent Yellow #30) | (dimethyl-hydroxyphenyl–N=N–(CH₃,CH₃)phenyl–CH(phenyl)–(CH₃,CH₃)phenyl–N=N–dimethyl-hydroxyphenyl) |
| Sudan Yellow GRN (Solvent Yellow #29) | (S-substituted hydroxyphenyl–N=N–(CH₃)(S-phenyl)phenyl–CH–(CH₃)phenyl–N=N–(S-phenyl)hydroxyphenyl) |

It is to be noted that dyes which do not conform to the above classification are not useful in this invention. Thus, for example, salicylic type dyes and water soluble dyes generally are not operative. Additionally water insoluble dyes which do not conform to the above classification, such as anthraquinone-type dyes are not operative.

The blend of polymer and nickel organic compound which has been melt spun or extruded into fibers or molded objects is then contacted with the dye bath. In general the dye bath contains from 0.5 to 5 weight percent of dye based on the weight of the material to be dyed. Since the dyes of this invention are not water soluble it is necessary to form a dispersion before adding water. This may be done by various conventional methods. For example a 50% aqueous methanol solution may be used to disperse the dye. Alternatively a paste may be formed with a standard dispersant such as Igepal (ethylene oxide adduct of a phenol) to which water is subsequently added. The temperature of dyeing and the time of immersion depend on the proportion of polymer in the blend, the particular polymer employed, the concentration of dye employed, and the intensity of color desired. These parameters can easily be determined by routine experimentation. The temperature of dyeing is not critical and can range from 25 to 120° C. although the dye bath is usually maintained at the boiling point.

This invention will be more fully understood by reference to the following examples.

*Example 1*

Polypropylene fibers were prepared as follows: A polypropylene polymer was formed by passing propylene gas into a dispersion containing Al(Et)$_3$ and TiCl$_3$ in a benzene diluent at a temperature of 80° C.

A crystalline polypropylene resulted having a melt index of 2.0 and an intrinsic viscosity (in tetralin at 120° C.) of 2.5. This polymer was spun into fibers by methods known in the art (see Example 2).

*Example 2*

Fibers were prepared from a blend of polypropylene and the nickel salt of 2-hydroxy 4-methoxybenzophenone specifically as follows: 99.5 pounds of stabilized polypropylene powder ($\eta$=2.2) was blended with 0.5 pound of nickel bis 2-hydroxy 4-methoxybenzophenone in a Henschel blender. The powder was extruded on a Prodex extruder and pelletized. The extrusion was carried out at 430° F. The pellets were fed to a fiber spinning machine where 210/34 multifilaments were prepared. The continuous multifilaments were drawn and twisted on a commercial draw-twister. The dyeing experiments were carried out on skeins made from this yarn. The skeins were scoured prior to the dyeing operation with a nonionic detergent and water. The physical properties of the undyed fibers were as follows:

Tenacity=6.0 grams/denier
Percent elongation=30

These fibers as well as the fibers of Example 1 were contacted with some of the dyes of this invention. Both sets of fibers were tested for light stability in the fadeometer as follows:

| Dye | Hours to Break in Fadeometer | |
|---|---|---|
| | Unmodified Fiber | Fiber with Nickel Compound |
| Oil Red O | 22 | 94 |
| Oil Red EGN | 30 | >120 |
| Sudan Red 4BA | 25 | >120 |
| Sudan Red GGA | 8 | 60 |
| Sudan Orange RA New | 22 | 70 |
| Sudan Orange RRA | 22 | >120 |
| Oil Orange O PEL | 23 | 120 |
| Orasol Yellow 3G | 25 | >120 |

As can be seen from the above data, the inclusion of specific nickel organic compounds in polypropylene fibers greatly improves the stability of certain dyes therein.

*Example 3*

A fiber formed from a blend of polypropylene and nickel acetylacetonate was prepared with amounts and conditions substantially as shown in Example 2, with the exception that nickel acetylacetonate was used in place of the nickel salt of 2-hydroxy 4-methoxybenzophenone. These fibers had good tenacity and when contacted with the dyes of this invention they exhibited good dye pickup and light stability (comparable with that shown by the blend of Example 2).

*Example 4*

A fiber formed from a blend of polypropylene and nickel C$_8$ oxoacetoacetate was prepared with amounts and conditions substantially as shown in Example 2, with the exception that nickel C$_8$ oxoacetoacetate was used in place of the nickel salt of 2-hydroxy 4-methoxybenzophenone. These fibers had good tenacity and when contacted with the dyes of this invention they exhibited good dye pickup and light stability (comparable with that shown by the blend of Example 2).

From the above examples it can be seen that by means of this invention a method is provided for increasing the uptake of selected dyestuffs within a poly alpha olefin and stabilizing them therein.

This invention has been described in connection with certain specific embodiments thereof; however, it should be understood that these are by way of example rather than by way of limitation, and it is not intended that the invention be restricted thereby.

What is claimed is:

1. A composition of matter consisting of a poly alpha olefin blended with .05 to 5.0 weight percent of a nickel organic compound selected from the class consisting of:
   (1) nickel derivatives of beta keto esters of the formula R—CO—CH$_2$—COOR', where R is a C$_1$–C$_{10}$ hydrocarbon and R' is a C$_1$–C$_{20}$ organic radical
   (2) nickel derivatives of aryl ketones of the formula

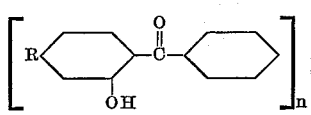

wherein $n$ varies between 1 and 2, R is selected from the class consisting of C$_1$–C$_{10}$ alkyl or alkoxy groups, and the remaining ring carbons may be substituted with halogen atoms.

2. The composition of claim 1 wherein the poly alpha olefin is polypropylene.

3. The composition of claim 2 wherein the nickel organic compound is the nickel salt of 2-hydroxy 4-methoxybenzophenone.

References Cited by the Examiner

UNITED STATES PATENTS 2,984,634  5/1961  Caldwell et al. _____ 260—94.96
3,163,492  12/1964  Thomas _____ 260—45.75

FOREIGN PATENTS 608,408  2/1962  Belgium.
665,264  6/1963  Canada.

JOSEPH L. SCHOFER, *Primary Examiner.*

E. M. OLSTEIN, L. EDELMAN, *Assistant Examiners.*